United States Patent
Singer et al.

(10) Patent No.: US 11,092,410 B1
(45) Date of Patent: Aug. 17, 2021

(54) LASER TAG GAMING SYSTEM AND METHOD OF USE

(71) Applicant: Champion Games LLC, Brooklyn, NY (US)

(72) Inventors: Aryeh Singer, Brooklyn, NY (US); Joseph Oberlander, Brooklyn, NY (US)

(73) Assignee: Champion Games LLC, Brooklyn, NY (US)

( * ) Notice: Subject to any disclaimer, the term of this patent is extended or adjusted under 35 U.S.C. 154(b) by 0 days.

(21) Appl. No.: 16/898,277

(22) Filed: Jun. 10, 2020

(51) Int. Cl.
*F41J 5/02* (2006.01)
*F41J 5/14* (2006.01)
*F41A 33/02* (2006.01)

(52) U.S. Cl.
CPC .............. *F41J 5/02* (2013.01); *F41A 33/02* (2013.01); *F41J 5/14* (2013.01)

(58) Field of Classification Search
CPC .......................................................... F41J 5/02

USPC .......................................................... 463/52
See application file for complete search history.

(56) References Cited

U.S. PATENT DOCUMENTS

| 7,338,375 | B1 * | 3/2008 | Small | F41A 33/02 463/39 |
| 2015/0278263 | A1 * | 10/2015 | Bowles | A63F 13/217 463/43 |
| 2017/0191800 | A1 * | 7/2017 | Fischer | F41J 5/02 |

* cited by examiner

*Primary Examiner* — Kesha Frisby
(74) *Attorney, Agent, or Firm* — Bochner IP, PLLC; Andrew D. Bochner (57) ABSTRACT

A laser tag gaming system is provided comprising a plurality of laser tag gaming apparatuses. Each laser tag gaming apparatus has a laser tag gun and a laser tag target, which can be wirelessly paired to one another. Gaming functionality can only be achieved upon receipt of a successful pair condition at a pairing circuit of each of the laser tag gun and laser tag target, which is lost if either of the laser tag gun and laser tag target is deactivated. This reduces the chances of players cheating by resetting their laser tag target.

19 Claims, 5 Drawing Sheets

LASER TAG GAMING SYSTEM AND METHOD OF USE

FIELD OF THE TECHNOLOGY

The present disclosure relates generally to a laser tag gaming system, and in particular, to a system for reducing incidences of cheating within a laser tag game. The invention further relates to a method of preventing unauthorized reset instances for a laser tag game, as well as to a wearable laser tag target.

BACKGROUND OF THE INVENTION

Laser tag is a leisure activity which allows players to participate in simulated combat. Each player has a laser gun, allowing them to shoot at other players, as well as a receiver for receiving hits from other players, typically in the form of a wearable item, such as a vest. Each player may then be assigned to a team, so that players can only register correct hits on other players on opposing teams.

In a typical game, a user will select their team color on both the gun and the vest. This process is cumbersome, if not performed by a single person who is familiar with the mechanics of team assignment, and can result in errors.

A player can in theory have one team color on the gun, and another team color on the vest. This, however, may cause problems with the game play. For example, a player may assign the blue team to their gun, but have a red team vest. This means that the player may shoot and hit players on the red team, but cannot be hit by anyone on the red team. Similarly, the player cannot hit players on the blue team, but can be hit by players on the blue team.

Alternatively, when a player runs out of lives, for example, by being hit on the vest a certain number of times, the same player's gun is unaware, allowing them to continue to shoot despite, in theory, being out of the game. Players must trust that other players will self-remove from the game when they are supposed to. Since a player needs to look at their vest, however, in order to see the life counter, a player may not easily recognize that they should have been eliminated.

Current laser tag systems may also allow for cheating to occur. Since team colors can be selected and changed at any point without resetting the game, a player on one team could temporarily change their vest color to become immune to shots from opponents, for example, while under attack from several players simultaneously, all in the course of one game. Similarly, vests can be easily reset to reset the life counter and change the team color, so that players can carry on playing indefinitely without their opponents realizing.

In-home or portable laser tag games have overcome this issue by providing wired connections between the gun and vest, thereby ensuring a permanent pairing between the gun and vest. However, this is a cumbersome approach, as the wire can inhibit free movement of the player.

Accordingly, an improved laser tag gaming system is therefore desired.

SUMMARY OF THE INVENTION

According to an aspect of the invention, there is provided a laser tag gaming system comprising: a plurality of laser tag gaming apparatuses, each laser tag gaming apparatus including: a laser tag gun having: a laser-tag signal emitter; a trigger input configured to cause the laser-tag signal emitter to emit a tagging signal; a first pairing circuit; and a wireless communicator associated with the first pairing circuit; and a wearable laser tag target having: a laser-tag signal receiver; a tag counter configured to log a number of successful tagging signals received at the laser-tag signal receiver by laser tag guns of at least one other laser tag gaming apparatus of the plurality of laser tag gaming apparatuses; a second pairing circuit; and a wireless communicator associated with the second pairing circuit; wherein the laser tag gun and wearable laser tag target are in continuous wireless communication with one another via the respective wireless communicators; wherein the laser tag gun and wearable laser tag target of each laser tag gaming apparatus are initialized by wireless communication between the first and second pairing circuits to respectively generate successful pair conditions at the first and second pairing circuit by user activation of at least a pairing control input on one of the laser tag gun and laser tag target; wherein the laser-tag signal emitter of the laser tag gun is inactive until the successful pair condition is registered at the first pairing circuit, and the laser-tag signal receiver of the wearable laser tag target is inactive until the successful pair condition is registered at the second pairing circuit; wherein the wearable laser tag target is configured to generate an override signal transmissible to the laser tag gun to deactivate the laser-tag signal emitter upon determination of a pre-determined threshold count at the tag counter; and wherein the successful pair condition is lost upon deactivation of the laser tag gun and/or wearable laser tag target.

At least one of the laser tag gun and wearable laser tag target may include an audio output device, the audio output device being configured to generate an audible reset sound upon initialization of wireless communication between the laser tag gun and wearable laser tag target.

The laser tag gaming system may further comprise a timer circuit associated with at least one of the laser tag gun and wearable laser tag target, the laser tag gun or wearable laser tag target being disabled for a duration determined by the timer circuit following activation thereof.

Optionally, the said duration determined by the timer circuit may be a predetermined duration.

In one embodiment, the said duration may be extendible by user input at the laser tag gun and/or wearable laser tag target.

The said duration may expire only upon the lack of a user input at the laser tag gun and/or wearable laser tag target for a predetermined further duration.

The laser tag gun may comprise a display screen, the display screen being communicable with the tag counter on the vest to display an output indicative of the number of successful tagging signals.

Optionally, the successful pair conditions may include team information.

The team information may be user-input team information input at the wearable laser tag target, the successful pair condition only being generated for the first pairing circuit upon receipt of the team information by the laser tag gun.

The laser tag gun and the wearable laser tag target both may include at least one illuminable visual output device.

Optionally, the laser tag gun or wearable laser tag target may include a stealth-mode input, the at least one illuminable visual output on both the laser tag gun and wearable laser tag target being deactivated upon user activation of the stealth-mode input.

Upon determination of the pre-determined threshold count at the tag counter, the at least one illuminable visual output on both the laser tag gun and wearable laser tag target may be deactivated automatically. Deactivation may further include causing a blinking of the LED lights.

Optionally, the at least one illuminable visual output may include a plurality of different colored illumination devices, a colored illumination device of the illuminable visual output being activated based on a team color selection by the user.

Each of the plurality of laser tag gaming apparatuses includes an onboard rechargeable battery, and further comprising a recharging module with which the laser tag gun and wearable laser tag target are engageable to enable recharging of their respective rechargeable batteries.

Optionally, the wireless communicators of the laser tag gun and wearable laser tag target may be radio-frequency communicators.

The pre-determined threshold count may be a user-set life count input during pairing of the laser tag gun and wearable laser tag target.

Deactivation of the laser tag gun or wearable laser tag target may remove any previous game information stored thereon.

According to another aspect of the invention, there is provided a method of preventing unauthorised reset instances for a laser tag game, the method comprising the steps of: (a) each player pairing a laser tag gun with a wearable laser tag target to create a player-specific laser tag gaming apparatus, the pairing being achieved via initialization by wireless communication between a laser-tag-gun pairing circuit and a laser-tag-target pairing circuit to respectively generate successful pair conditions at the laser-tag-gun pairing circuit and a laser-tag-target pairing circuit by user activation of at least a pairing control input of one of the laser tag gun or laser tag target; (b) maintaining continuous wireless communication between the laser tag gun and wearable laser tag target while the laser tag gun and wearable laser tag target are paired; (c) activating a laser-tag signal emitter of the laser tag gun only upon the registration of the successful pair condition at the laser-tag-gun pairing circuit, and activating the laser-tag signal receiver of the wearable laser tag target only upon registration of the successful pair condition at the laser-tag-target pairing circuit; (d) deactivating the laser-tag signal emitter upon determination of a pre-determined threshold count at the tag counter; and (e) de-registering the successful pair conditions in the event of deactivation of the laser tag gun and/or wearable laser tag target.

According to a further aspect of the invention, there is provided a wearable laser tag target comprising: a laser-tag signal receiver; a tag counter configured to log a number of successful tagging signals received at the laser-tag signal receiver by one or more laser tag guns; and a pairing circuit configured to pair the wearable laser tag target with a pairable laser tag gun; wherein the laser-tag signal receiver and tag counter are configured to be activatable only upon receipt of a successful pair condition at the pairing circuit.

The wearable laser tag target may be provided as a vest target.

Other aspects, as well as features and advantages of various aspects of the disclosed subject matter will become apparent to those of ordinary skill in the art through consideration of the ensuing description, the accompanying drawings, and the appended claims.

DETAILED DESCRIPTION OF THE INVENTION

Figure 1:
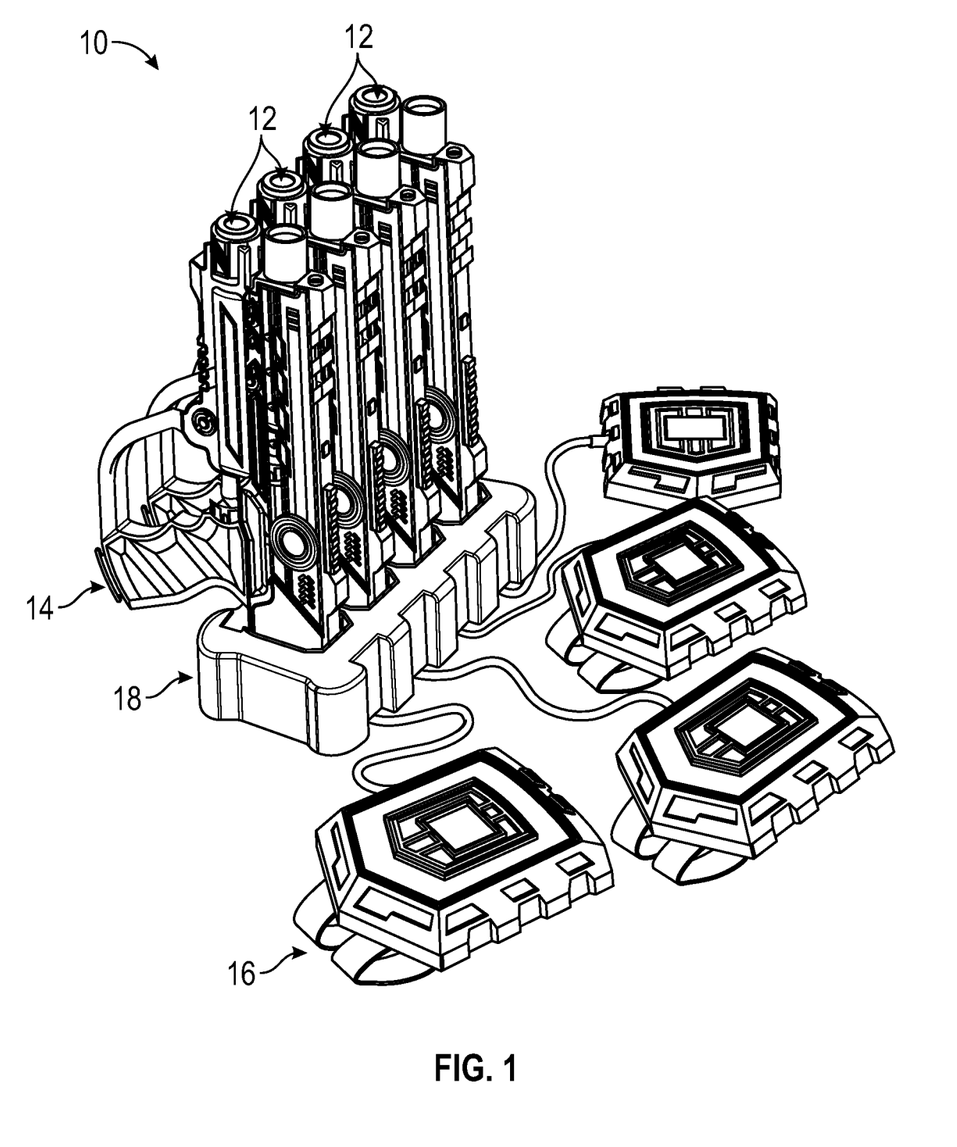
FIG. 1 shows a perspective representation of one embodiment of a laser tag gaming system in accordance with the invention.

Referring to FIG. 1, illustrated herein is a laser tag gaming system, referred to as system 10. The laser tag gaming system 10 may include a plurality of laser tag gaming apparatuses 12, each of which may form a set for an individual player during the game.

Each laser tag gaming apparatus 12 may be include a laser tag gun 14 and laser tag target 16, which respectively allow participants to shoot and be shot at during the laser tag game. Each of the laser tag gun 14 and laser tag targets 16 may be formed so as to be independent to one another. To avoid the need for batteries which must be replaced once depleted, each power supply may be provided as a rechargeable battery, such as a lithium ion battery. The laser tag gun 14 and laser tag target 16 could then be charged, in some embodiments simultaneously, via a central charging hub 18 which serves as a recharging module.

The laser tag gun 14 and laser tag target 16 of a single laser tag gaming apparatus 12 may be color-coordinated to one another, for example, for aesthetic purposes.

Figure 2:
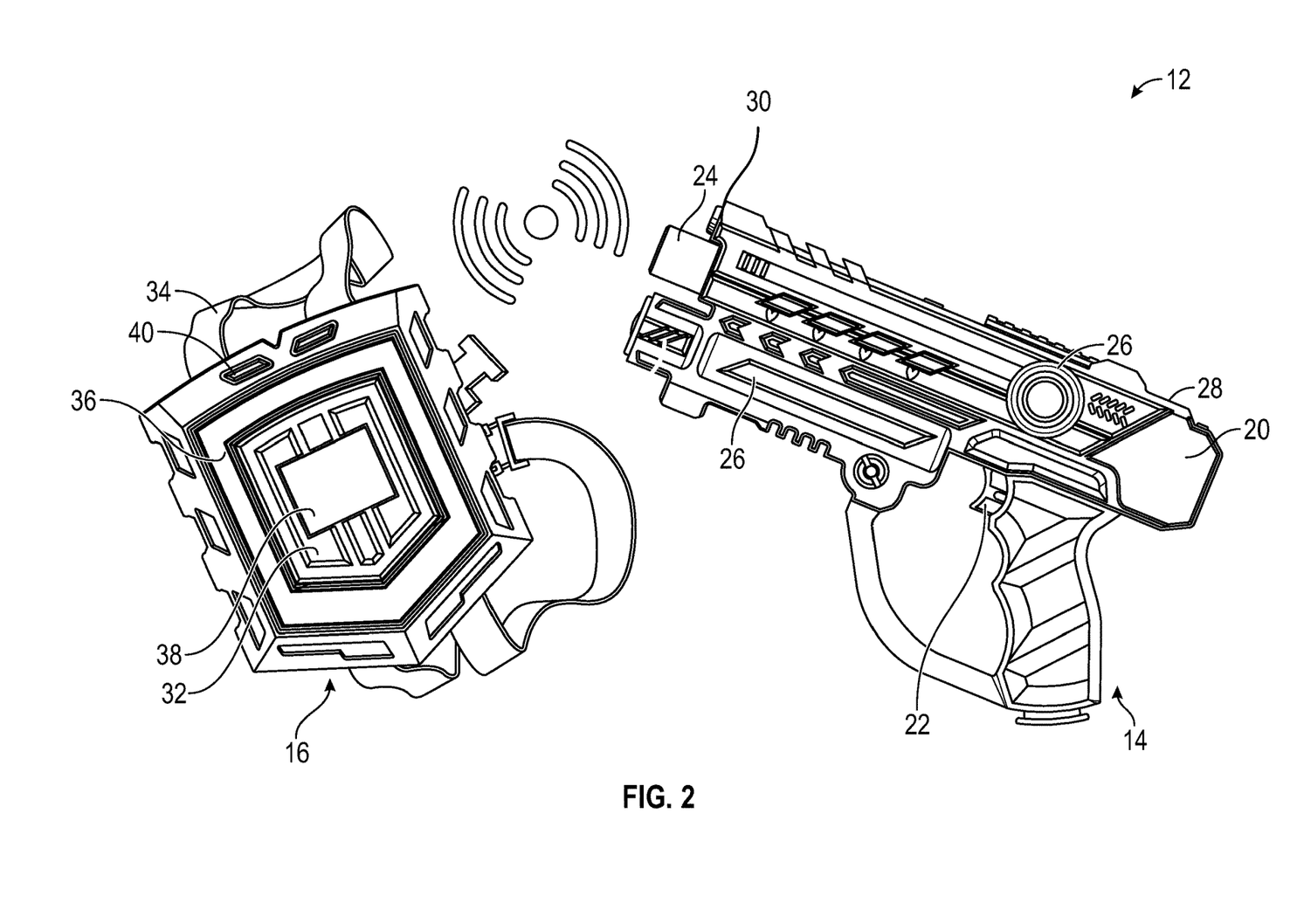
FIG. 2 shows a front perspective representation of a laser tag gaming apparatus of the laser tag gaming system of FIG. 1.

A single laser tag gaming apparatus 12 is shown in FIG. 2. In an embodiment, the laser tag gun 14 is provided having a rigid plastic molded case 20 that has the appearance of a pistol, but which could be molded to the form of an alternative firearm, such as a rifle, machine gun, or rocket launcher, for example. A trigger 22 is provided, which may allow the user to activate a laser tag signal emitter 24 of the laser tag gun 14.

The laser tag signal emitter 24 may be an infra-red signal emitter. The laser tag signal emitter 24 may not be an actual laser; in certain embodiments, while the gaming format is colloquially referred to as laser tag, actual laser beams are not used for safety reasons, and it will be apparent that the present arrangement is not intended to require a functioning laser beam emitter.

The laser tag gun 14 includes at least one illuminable visual output 26, and may include a plurality of individual different colored illumination devices. This allows team information relating to the player to be visually conveyed to other players. The at least one illuminable visual output 26 may include one or more colored light-emitting diodes, and may be provided with a controller to permit specific visual output signals, such as flashing or blinking output to indicate successful hits on other players, for example.

A display screen 28, such as an LCD display screen, may also be provided onboard the laser tag gun 12, for example on the top surface of the case 20. This display screen 28 provides information to the user, such as ammunition count, battery life of the laser tag gun 14, and a life count. One or more of these may be received from the laser tag target 14 via wireless communication, as will be discussed in more detail below.

A flashlight 30 may be provided on the front end of the laser tag gun 14, to provide the user with a device for illuminating their environment. This may be advantageous, for example, when the user is playing in the dark.

The laser tag target 16 may be formed to be wearable, and is illustrated in FIG. 2 as a vest, being worn on the chest via the use of shoulder straps 34. The shoulder straps 34 are formed so as to be adjustable, via the use of elasticated material, or perhaps with an adjustable buckle or similar fastener. The laser tag target 16 may include a laser-tag signal receiver 32, for receiving and registering hits.

One or more illuminable visual outputs 36 may also be provided on the laser tag target 16, which may synchronize with those of the laser tag gun 14. This again could be used to convey team information to other players, for example, team color. In the depicted embodiment, an outer portion of the laser tag target is provided as an illuminable visual output 36, surrounding a central display portion 38. The display portion 38 may be provided as a display screen, such as an LCD display screen, which indicates a remaining life count to other players, and which is displayed prominently on the player's chest. In an embodiment, the display portion 38 may display the remaining battery life, via, for example, a battery life indicator.

The electronic components of the laser tag target 16 may be provided enclosed within a rigid plastics casing, which may advantageously provide a delineated border for the illuminable visual outputs 36. The activation input 40 of the laser tag target 16 may also be housed within the casing; a similar activation input is provided for the laser tag gun 14 to allow independent activation, or on/off functionality, of the laser tag gun 14 and laser tag target 16.

In some embodiments, the laser tag gun 14 may further include, in addition to laser tag signal emitter 24, a laser tag signal receiver 32. In an embodiment, there may be a first laser tag signal receiver 32 within laser tag gun 14 and a second within laser tag target 16. In certain embodiments, a hit registered by the laser tag signal receiver in gun 14 may be synced with the laser tag target 16, as further discussed herein. Thus, this may provide an additional target point, in addition to target 16.

Figure 3:
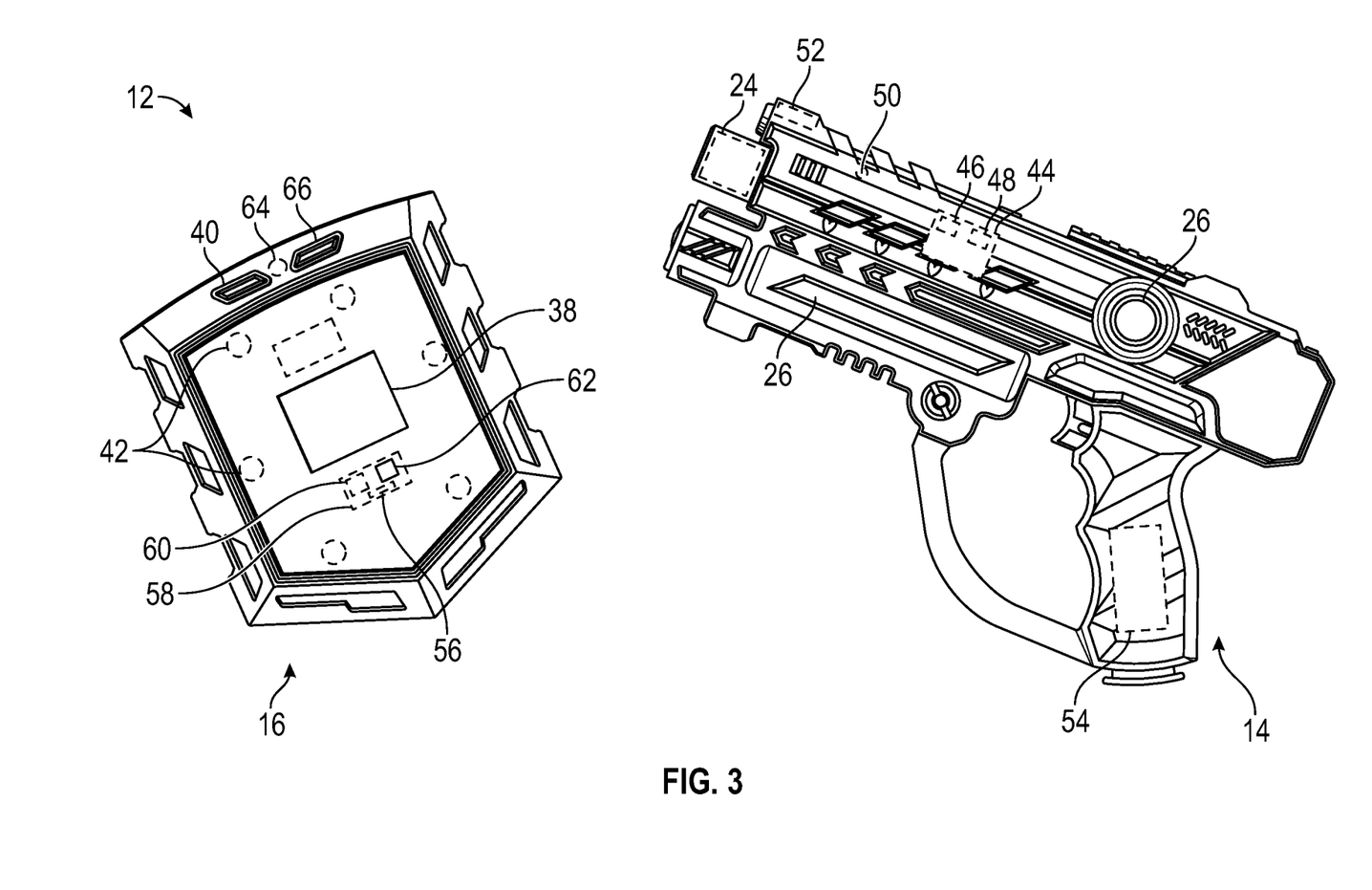
FIG. 3 shows an indicative representation of the electronic components of the laser tag gaming apparatus of FIG. 2.
Figure 4:
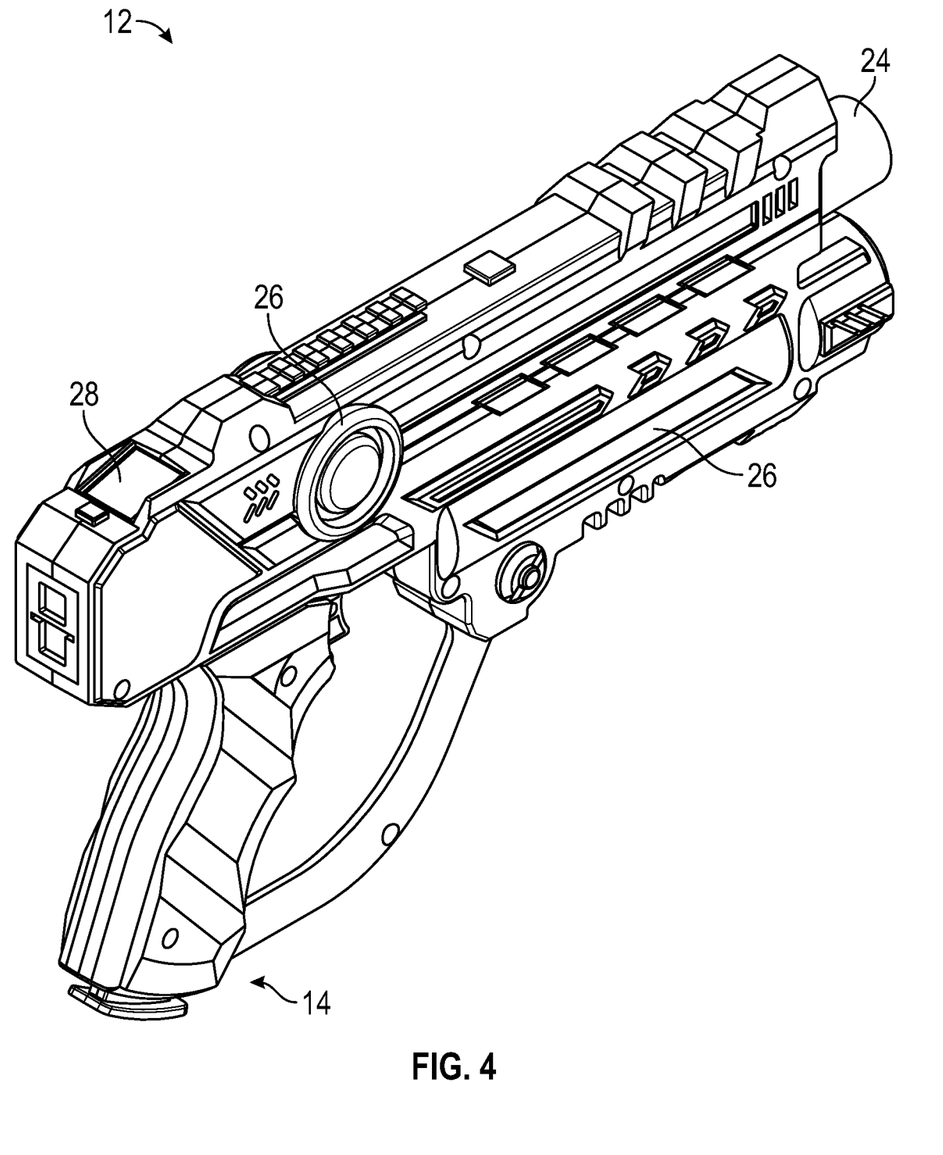
FIG. 4 illustrates a laser tag gaming apparatus in accordance with an embodiment.
Figure 5:
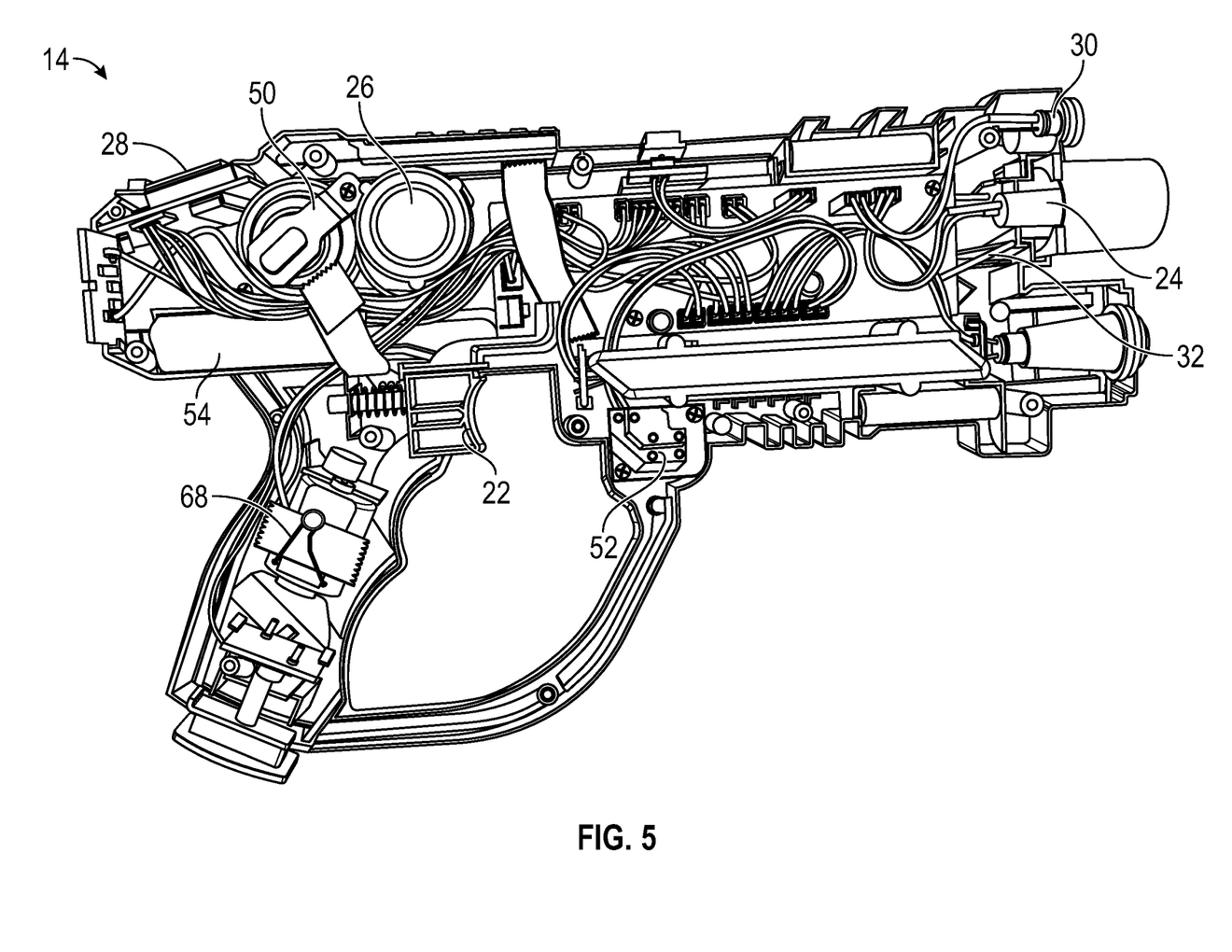
FIG. 5 illustrates a laser tag gaming apparatus in accordance with an embodiment.

FIG. 3 shows some of the internal electronic components of the laser tag gaming apparatus 12 in dashed lines. For example, the LED lights 42 forming the illuminable visual output 36 of the laser tag target 16 are indicated.

The laser tag gun 14 includes a controller 44, which may be formed as a single circuit board having the relevant electronic components thereon as per the following description. It will, however, be appreciated that the electronic components could be formed as independent circuit components.

The controller 44 includes a first pairing circuit 46 and a second pairing circuit 48. Circuit 46 and 48 may include all or some of the features of the other. Circuit 46 or 48 may enable the registration of a successful pairing condition at the laser tag gun 14, as well as a wireless communicator 48 in communication with at least the first pairing circuit 46, to permit data transfer between the laser tag gun 14 and laser tag target 16 continuously through the game, other than via the signals transmitted during tagging using the laser-tag signal emitter 24.

An audio output device 50 (not shown) is also provided on the laser tag gun 14 for emitting sounds such as gunfire noises, and a volume control or mute button 52 (not shown) may be associated therewith. An onboard rechargeable battery 54 is also provided, which can be charged via the central charging hub 18.

The laser tag target 16 may include a tag counter 56, which is formed as an electronic circuit having processing capabilities for registering a total number of hits received at the laser tag receiver 32 and thereby determining a number of lives remaining for the player. This remaining life count can then be displayed on the display portion 38 of the laser tag target 16.

The laser tag target 16 may also include a controller 58, of which the tag counter 56 may be part, which may be formed as a single circuit board having the relevant electronic components thereon as per the following description. It will, however, be appreciated that the electronic components could be formed as independent circuit components.

The controller 58 may include a second pairing circuit 60 which enables the registration of a successful pairing condition at the laser tag target 16, as well as a wireless communicator 62 in communication with at least the second pairing circuit 60 to permit data transfer between the laser tag target 16 and laser tag gun 14 continuously through the game, other than via the signals transmitted during tagging using the laser-tag signal emitter 24. The second pairing circuit 60 may also be communicable with the tag counter 56, with the tag counter 56 being inoperable until the successful pair condition is registered. In some embodiments, the laser tag target 16 may include an audio output device 64 to make an audible output upon successful registration of the pair condition.

In an embodiment, a laser tag game cannot begin before pairing of the first and second pairing circuits 46, 60, such that a successful pair condition is generated at both the laser tag gun 14 and laser tag target 16. Until said successful pair condition is generated, for example, the laser tag gun 14 cannot activate its laser tag signal emitter 24 to fire shots, and the laser tag target 16 cannot receive hits at the laser tag signal receiver 32, as shown in FIG. 2. In other words, in such embodiments, a laser tag gaming apparatus 12 may be inoperable before pairing of the laser tag gun 14 and laser tag receiver 16.

In some embodiments, a player is not able to choose a team before pairing, in the present pairing methodology. Initially, the team color of the laser tag gaming apparatus 12 will not be set, and the illuminable visual outputs 26, 36 will emit only white light.

To pair the laser tag gun 14 and laser tag target 16, a pairing action may be performed, which will allow a pairing signal to be transmitted via the wireless communicators 48, 62 to the respective first and second pairing circuits 46, 60. In an embodiment, this is achieved by, during the pairing process, the user shooting the laser tag target 16 with the laser tag gun 14 of the laser tag gaming apparatus 12.

It is noted that even though the laser tag gun 14 does not shoot ammunition before pairing, it is still capable of emitting radiofrequency signals to achieve pairing. In summary, the laser tag gun 14 may emit a radiofrequency signal, but not in ammunition form. This is purely for the purpose of initiating pairing function.

Once pairing has been initiated, the laser tag gaming apparatus 12 may enter a setup mode. This may be accompanied by an audible output from the audio output device 50, which, in an arrangement, may be repeated at predetermined intervals so as to signal to other players that the user of the laser tag gaming apparatus 12 is attempting to pair. This will identify cheating mid-game.

When in setup mode, the user can choose their team, via a specific team selection button 66 on, for example, the laser tag target 16. Use of the button may, for example, cycle through team colors, with the illuminable visual outputs 26, 36 providing an indication to the player of the selected team. Similarly, the player is able to select their total life count on the tag counter 56. This is not necessarily the same for each player, and allows for the provision of handicaps for more experienced players.

The setup mode may remain active for a predetermined duration, for instance, 30 seconds from activation. During this period, the illuminable visual outputs 26, 36 may blink, as well as the display portion 38.

While in setup mode, the laser tag gaming apparatus 12 may remain inactive. In an embodiment, the laser tag gun 14 cannot shoot, and the laser tag target 16 cannot receive hits. The game can start, however, as soon as setup mode ends.

It is highly feasible that players require more set-up time than the predetermined duration. As such, each laser tag gaming apparatus 12 can be configured so that any further input, via any or a specific button input on laser tag target 16, may extend the duration of setup mode. In the first instance, this may be by an additional 10 seconds. This duration extension can be overwritten each time a button is pressed, so that the setup mode, if extended, expires 10 seconds following the preceding button press.

The reset behavior of the present laser tag gaming system 10 provides several advantageous effects. Firstly, since the laser tag gun 14 and laser tag target 16 are always in continuous communication with one another, and can only operate once paired, information can be shared between the two, for example, remaining life count. Furthermore, once a player runs out of lives, the laser tag gun 14 stops shooting, which is linked to the continuous pairing functionality.

The pairing process also deters a player from cheating by resetting their laser tag target 16 or changing team color during a game, since the pairing process takes a long time, in comparison with the timeframe of a game, and also distinct sounds are emitted which indicate that a pairing process is underway.

This reset mechanism creates a method of preventing unauthorized reset instances for a laser tag game. In one embodiment, each player pairs their laser tag gun 14 with their wearable laser tag target 16 to create a player-specific laser tag gaming apparatus 12. This pairing is achieved via initialization by wireless communication between the laser-tag-gun pairing circuit 46 and the laser-tag-target pairing circuit 60 to respectively generate successful pair conditions at the laser-tag-gun pairing circuit 46 and the laser-tag-target pairing circuit 60 by user activation of at least a pairing control input of one of the laser tag gun 14 or laser tag target 16.

Continuous wireless communication between the laser tag gun 14 and wearable laser tag target 16 may be maintained while the laser tag gun 14 and wearable laser tag target 16 are paired. The laser-tag signal emitter 24 of the laser tag gun 14 may only activated upon the registration of the successful pair condition at the laser-tag-gun pairing circuit 46, and similarly, the laser-tag signal receiver 32 of the wearable laser tag target 16 (or gun 14) only upon registration of the successful pair condition at the laser-tag-target pairing circuit 60.

The continuous wireless communication between the laser tag gun 14 and the laser tag target 16 has the added advantage of allowing gaming information to be transferred in real time between the laser tag gun 14 and the laser tag target 16. For example, information from the tag counter 56 can be transmitted to the laser tag gun 14 wirelessly, allowing for the user to be more easily informed of their own remaining life count. If this appears on the display on the top surface of the laser tag gun 14, then the act of checking is much simplified.

To end the game for a player, the laser-tag signal emitter 24 is deactivated upon determination of a pre-determined threshold count at the tag counter 56, that is, once all of that player's lives have been lost. It will be apparent however that other game ending conditions could be considered. For example, a timed game could be provided, in which case, total number of tags registered at the tag counter 56 would be a more important metric than remaining lives.

The successful pair conditions are, at any point in the process, de-registered in the event of deactivation of the laser tag gun 14 and/or wearable laser tag target 16. This prevents unauthorized changing of a player's life count or team color. Deactivation may further include causing a blinking of the LED lights 42.

A volume control or mute button 52 may also be provided, typically on the laser tag gun 14. This may allow the user to turn off all sounds from the laser tag gun 14 and/or laser tag target 16. This mute button 52 may also be used to activate a stealth mode for the laser tag gaming apparatus 12. This is achievable since the laser tag gun 14 and laser tag target 16 are in continuous wireless communication with one another.

To activate stealth mode in an embodiment, the mute button 52 is pressed concurrently with the trigger 22, thereby activating the stealth mode. This deactivates all lights and sounds from both the laser tag gun 14 and the laser tag target 16, other than the LCD screens. This is active for a predetermined duration, such as 30 seconds.

Stealth mode is an enhanced gaming mode which is only accessible due to the pairing and continuous communication between the laser tag gun 14 and laser tag target 16.

In some embodiments, stealth mode may also incorporate anti-cheating functionality. In particular, gun 14 and target 16 are paired with one another. This pairing prevents a swapping out of the vest to gain additional lives during a game. That is, since the vest and gun must be paired in this embodiment, activation of stealth mode would cause the vest to go stealth as well. If the vest is swapped for a new vest during the game, in order to gain additional lives, they would not be properly paired, and thus the vest would not enter stealth mode, highlighting the cheating attempt. Accordingly, the stealth mode may provide an additional anti-cheating feature.

Each laser tag gaming apparatus 12 has various additional advantageous features other than those related to the novel reset and pair functionality herein described.

When the laser tag gun 14 and/or laser tag target 16 is activated via their respective activation inputs 40, an audible initialization sound may be produced via the audio output device 50. An audible deactivation sound may also be produced on deactivation of the laser tag gun 14 and/or laser tag target 16, which may be different to the audible initialization sound.

Deactivation of the laser tag gun 14 or laser tag target 16 may remove any stored memory from the system, not only with regards to the successful pair condition, but also any stored team information. As previously detailed, in an embodiment, only another successful pair condition initialization can reactivate the playing capabilities of the laser tag gun 14 and laser tag target 16. Either of the laser tag gun 14 and laser tag target 16 may automatically deactivate after a predetermined idle period, for example, ten minutes, or any other suitable period of time, in order to conserve the onboard battery unit.

Once paired, the laser tag gun 14 and laser tag target 16 respectively illuminate the relevant colored LEDs 42 or similar illumination device once team information data is received, typically from the laser tag target 16. When the laser tag gun 14 and laser tag target 16 are first initialized, prior to pairing, the default illumination color will be white, which is not traditionally a team color in laser tag games. A default white color indicates to users that a team selection is required, which can be achieved by pairing the laser tag gun 14 and laser tag target 16 while pressing the team select button or similar pairing control input 66, which may be on the laser tag target 16.

The trigger 22 of the laser tag gun 14 may be configured to create a signal from the laser tag signal emitter 24, provided that an ammo counter of the laser tag gun 14 indicates that a shot can be made. Different ammo types may be pre-programmed into an ammo controller of the laser tag gun 14, allowing the user to vary the type of laser tag signal which is emitted. The laser tag signal may therefore have identifying data which alters the amount of lives lost when a laser tag target 16 of another player is hit. A reload input button on the laser tag gun 14 is provided to allow the user to reload their ammo counter. Each weapon type, such as a pistol, machine gun, rifle, or rocket launcher, may have a different maximum ammo count before a reload action is required, and furthermore may have different identifying data as to how many lives a hit laser tag target 16 will lose at its tag counter 56. Different weapon modes may have different functionality with regards to the trigger 22. For example, separate trigger 22 activations may not be required for the machine gun mode; a player may instead hold the trigger 22 down. Selection of each weapon mode may be via a dedicated button on the laser tag gun 14, which may have an associated illumination device associated therewith.

The laser tag target 16 may include a mechanism for adjusting the number of lives available to the tag counter 56. This may be provided via the provision of +/− buttons on the laser tag gun 14 or laser tag target 16.

In one embodiment, laser tag gun 14 may include vibration mechanism 68, which may cause the gun 14 to vibrate. For example, upon activation, deactivation, firing a shot or receiving a shot, the gun 14 may be caused to vibrate.

It is therefore possible to provide a laser tag gaming apparatus which demonstrably reduces the potential for cheating by forcing reinitialization of a successful pair condition each time the laser tag gun and/or laser tag target is switched off. This prevents a user from just resetting their life counter or team color mid game.

The words 'comprises/comprising' and the words 'having/including' when used herein with reference to the present invention are used to specify the presence of stated features, integers, steps or components, but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention as defined herein.

What is claimed is:

1. A laser tag gaming system comprising:
a plurality of laser tag gaming apparatuses, each laser tag gaming apparatus including:
a laser tag gun comprising:
a laser-tag signal emitter;
a trigger input configured to cause the laser-tag signal emitter to emit a tagging signal;
a first pairing circuit; and
a wireless communicator associated with the first pairing circuit; and
a wearable laser tag target comprising:
a laser-tag signal receiver;
a tag counter configured to log a number of successful tagging signals received at the laser-tag signal receiver by laser tag guns of at least one other laser tag gaming apparatus of the plurality of laser tag gaming apparatuses;
a second pairing circuit; and
a wireless communicator associated with the second pairing circuit;
wherein the laser tag gun and the wearable laser tag target are in continuous wireless communication with one another via the respective wireless communicators;
wherein the laser tag gun and the wearable laser tag target of each laser tag gaming apparatus are initialized by wireless communication between the first and second pairing circuits to respectively generate successful pair conditions at the first and second pairing circuit by user activation of at least a pairing control input on one of the laser tag gun and laser tag target;
wherein the laser-tag signal emitter of the laser tag gun is inactive until the successful pair condition is registered at the first pairing circuit, and the laser-tag signal receiver of the wearable laser tag target is inactive until the successful pair condition is registered at the second pairing circuit;
wherein the wearable laser tag target is configured to generate an override signal transmissible to the laser tag gun to deactivate the laser-tag signal emitter upon determination of a pre-determined threshold count at the tag counter;
wherein the successful pair condition is lost upon deactivation of the laser tag gun and/or the wearable laser tag target; and
wherein the laser tag gun includes an audio output device, the audio output device being configured to generate an audible reset sound upon initialization of wireless communication between the laser tag gun and the wearable laser tag target.

2. The laser tag gaming system of claim 1, further comprising a timer circuit associated with at least one of the laser tag gun and the wearable laser tag target, the laser tag gun or the wearable laser tag target being disabled for a duration determined by the timer circuit following activation thereof.

3. The laser tag gaming system of claim 2, wherein the said duration determined by the timer circuit is a predetermined duration.

4. The laser tag gaming system of claim 2, wherein the said duration is extendible by user input at the laser tag gun and/or the wearable laser tag target.

5. The laser tag gaming system of claim 4, wherein the said duration expires only upon the lack of a user input at the laser tag gun and/or the wearable laser tag target for a predetermined further duration.

6. The laser tag gaming system of claim 1, wherein the laser tag gun comprises a display screen, the display screen being communicable with the tag counter to display an output indicative of the number of successful tagging signals.

7. The laser tag gaming system of claim 1, wherein the successful pair conditions include team information.

8. The laser tag gaming system of claim 7, wherein the team information is user-input team information input at the wearable laser tag target, the successful pair condition only being generated for the first pairing circuit upon receipt of the team information by the laser tag gun.

9. The laser tag gaming system of claim 1, wherein the laser tag gun and the wearable laser tag target both include at least one illuminable visual output device.

10. The laser tag gaming system of claim 9, wherein the laser tag gun or the wearable laser tag target includes a stealth-mode input, the at least one illuminable visual output on both the laser tag gun and the wearable laser tag target being deactivated upon user activation of the stealth-mode input.

11. The laser tag gaming system of claim 9, wherein upon determination of the pre-determined threshold count at the tag counter, the at least one illuminable visual output on both the laser tag gun and the wearable laser tag target initiates a blinking sequence.

12. The laser tag gaming system of claim 9, wherein the at least one illuminable visual output includes a plurality of different colored illumination devices, a colored illumination device of the illuminable visual output being activated based on a team color selection by the user.

13. The laser tag gaming system of claim 1, wherein each of the plurality of laser tag gaming apparatuses includes an onboard rechargeable battery, and further comprising a recharging module with which the laser tag gun and the wearable laser tag target are engageable to enable recharging of their respective rechargeable batteries.

14. The laser tag gaming system of claim 1, wherein the wireless communicators of the laser tag gun and the wearable laser tag target are radio-frequency communicators.

15. The laser tag gaming system of claim 1, wherein the pre-determined threshold count is a user-set life count input during pairing of the laser tag gun and the wearable laser tag target.

16. The laser tag gaming system of claim 1, wherein deactivation of the laser tag gun or the wearable laser tag target removes any previous game information stored thereon.

17. A method of preventing unauthorised reset instances for a laser tag game, the method comprising the steps of:
pairing a laser tag gun with a wearable laser tag target to create a player-specific laser tag gaming apparatus, the pairing comprising initialization by wireless communication between a laser-tag-gun pairing circuit and a laser-tag-target pairing circuit to respectively generate successful pair conditions at the laser-tag-gun pairing circuit and the laser-tag-target pairing circuit by user activation of at least a pairing control input of one of the laser tag gun or laser tag target, the initialization by wireless communication generating an audible reset sound;
maintaining continuous wireless communication between the laser tag gun and the wearable laser tag target while the laser tag gun and the wearable laser tag target are paired;
activating a laser-tag signal emitter of the laser tag gun only upon the registration of the successful pair condition at the laser-tag-gun pairing circuit, and activating the laser-tag signal receiver of the wearable laser tag target only upon registration of the successful pair condition at the laser-tag-target pairing circuit;
deactivating the laser-tag signal emitter upon determination of a pre-determined threshold count at the tag counter; and
de-registering the successful pair conditions in the event of deactivation of the laser tag gun and/or the wearable laser tag target.

18. A wearable laser tag target comprising:
a laser-tag signal receiver;
a tag counter configured to log a number of successful tagging signals received at the laser-tag signal receiver by one or more laser tag guns; and
a pairing circuit configured to pair the wearable laser tag target with a pairable laser tag gun;
wherein the laser-tag signal receiver and tag counter are configured to be activatable only upon receipt of a successful pair condition at the pairing circuit; and
wherein the wearable laser tag target includes an audio output device, the audio output device being configured to generate an audible reset sound upon initialization of wireless communication between the laser tag gun and the wearable laser tag target.

19. The wearable laser tag target as claimed in claim 18, wherein the wearable laser tag target is provided as a vest target.

* * * * *